United States Patent Office 3,500,720
Patented Mar. 17, 1970

3,500,720
FLUID PRESSURE DISTRIBUTION SYSTEM
Heinrich Wagner and Erich Jablonsky, Schwabisch Gmund, Germany, assignors to Zahnradfabrik Friedrichshafen Aktiengesellschaft, Friedrichshafen, Germany
Filed May 3, 1967, Ser. No. 635,887
Claims priority, application Germany, May 11, 1966, Z 12,208
Int. Cl. F15b 13/06, 15/18
U.S. Cl. 91—412                                              5 Claims

ABSTRACT OF THE DISCLOSURE

The invention comprises a pair of hydraulic circuits, one of which encompasses pressure fluid flow to and from a booster steering mechanism, and another of which encompasses pressure fluid flow to and from an accessory cylinder. A pump and reservoir form a common branch of the two systems with pressure inlet being only from the pump to the booster steering mechanism housing in which is incorporated a flow divider valve operable to divert flow to the accessory cylinder when the pump is speeded up by engine acceleration. A manual control valve is utilized for selectively shunting flow to the accessory cylinder from the booster mechanism housing or from the accessory cylinder to the reservoir.

---

The present invention avoids drawbacks of the prior art by providing a flow divider valve in the steering control valve housing thereby eliminating various exterior conduits and fittings.

FIELD OF THE INVENTION

The invention is primarily in the field of utility vehicle which have power steering and hydraulically powered accessories.

DESCRIPTION OF THE PRIOR ART

The prior art is shown in British Patent 589,095, disclosing a control arrangement in which the flow divider valve is separate and isolated from the accessory cylinder as well as the power booster mechanism. Accordingly, complex hydraulic circuitry is required to hook up the various components of the system, wherein the several connections and fittings necessary represent possible sources of trouble. Another prior art arrangement is shown in German Federal Patent 1,060,681, which shows a complex flow divider valve having a pressure relief valve built into it and which has a foreshortened construction requiring the need of additional tubing for connections to the pressure using apparatus and for excess pressure flow to a reservoir.

SUMMARY OF THE INVENTION

The invention provides a simple and compact valving arrangement for dividing flow between a power boost cylinder and a pressure actuated single ended cylinder which may be utilized for a vehicle accessory, for example, a hoist. A characteristic of the invention is that a flow divider valve is utilized which is a simple sleeve reciprocally disposed in a bore of the power booster mechanism housing. The sleeve is provided with an orifice exposed to fluid pressure and through which feed to the steering control valve is effected. An increase in fluid pressure acting against the divider valve shifts the valve to provide a source of fluid pressure for the accessory cylinder. A safety relief valve is provided such that in the event of an excess in pressure in that cylinder, relief flow is effected. The safety relief valve by-passes a manually operable valve which is exterior of the booster steering mechanism and which serves to control flow to and from the accessory cylinder. A pump and reservoir are provided as part of the overall system, the single pump effecting pressure for power steering and for operating the accessory cylinder.

DESCRIPTION OF THE INVENTION

Figure 1:
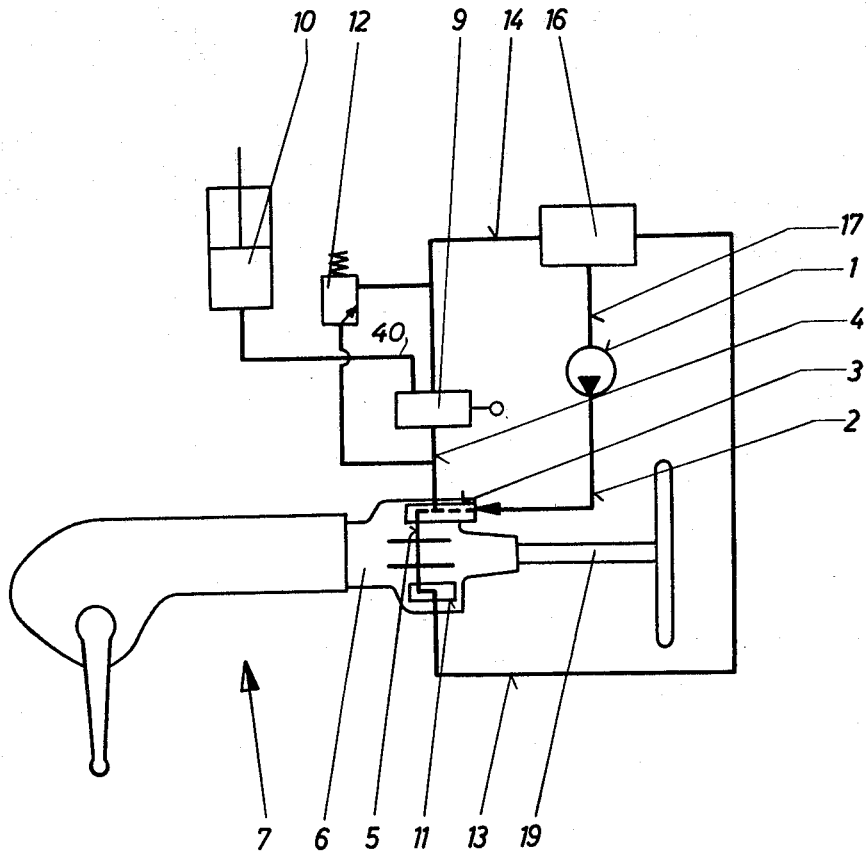
FIG. 1 of the drawing shows a diagrammatic arrangement of the dual system of the invention.

Referring to the drawing, a steering booster housing 7 is illustrated having the steering control valve housing section 6 to which pressure fluid is fed via inlet pressure line means such as conduit 2 from the outlet of a pump 1 which draws oil from a reservoir 16 through an inlet conduit 17.

The booster steering mechanism need not be disclosed in detail since it is of the type and structure shown in the U.S. patent to Jablonsky 3,242,824, issued Mar. 29, 1966 and assigned to the assignee of the present application. Briefly, however, the valve housing 6 is connected to a cylinder housing and a central steering spindle 19 passes through a steering control valve 8 of a slidable sleeve type having various passages and bores for feed to, and exhaust from, a double-ended power steering cylinder via conduits 18 and 22. A pressure relief valve 11 is provided having the same construction and mode of operation as the valve 91 and pressure chamber 95 of the aforementioned U.S. patent, details being omitted herein but reference being made to that patent for supplying such details.

The power boost mechanism per se is fully explained in the aforementioned patent and does not form any part of the present invention except to the extent claimed.

Pressure fluid from pump 1, driven by the engine (not shown), entering via inlet conduit 2 passes through a restricted orifice 31 at the end of the sleeve body 33 of the divider valve construction 3. A spring 32 maintains the divider valve in the position shown in FIG. 2 when the pump is not running so that no fluid passes through the valve 3. However, when the pump is running valve sleeve 33 moves to the left and a small gap opens from inlet conduit 2 to conduit 4 leading to a manually operable multi-way control valve 9, which controls fluid passage to and from an accessory cylinder 10 via conduit 40. Valve 9 is of the same type as valve V illustrated in FIG. 3 of the co-pending application Ser. No. 626,076, filed Mar. 27, 1967, entitled Valve Device. When the pump is speeded up sleeve 33 moves further to the left. Thus, under all conditions of fluid flow and load pressure build up in both fluid systems the valve sleeve 33 takes a position in which the force exerted by the spring 32 and hydraulic pressure forces existing before and behind orifice 31 are balanced, a known principle of actuation for flow divider valves.

Figure 2:
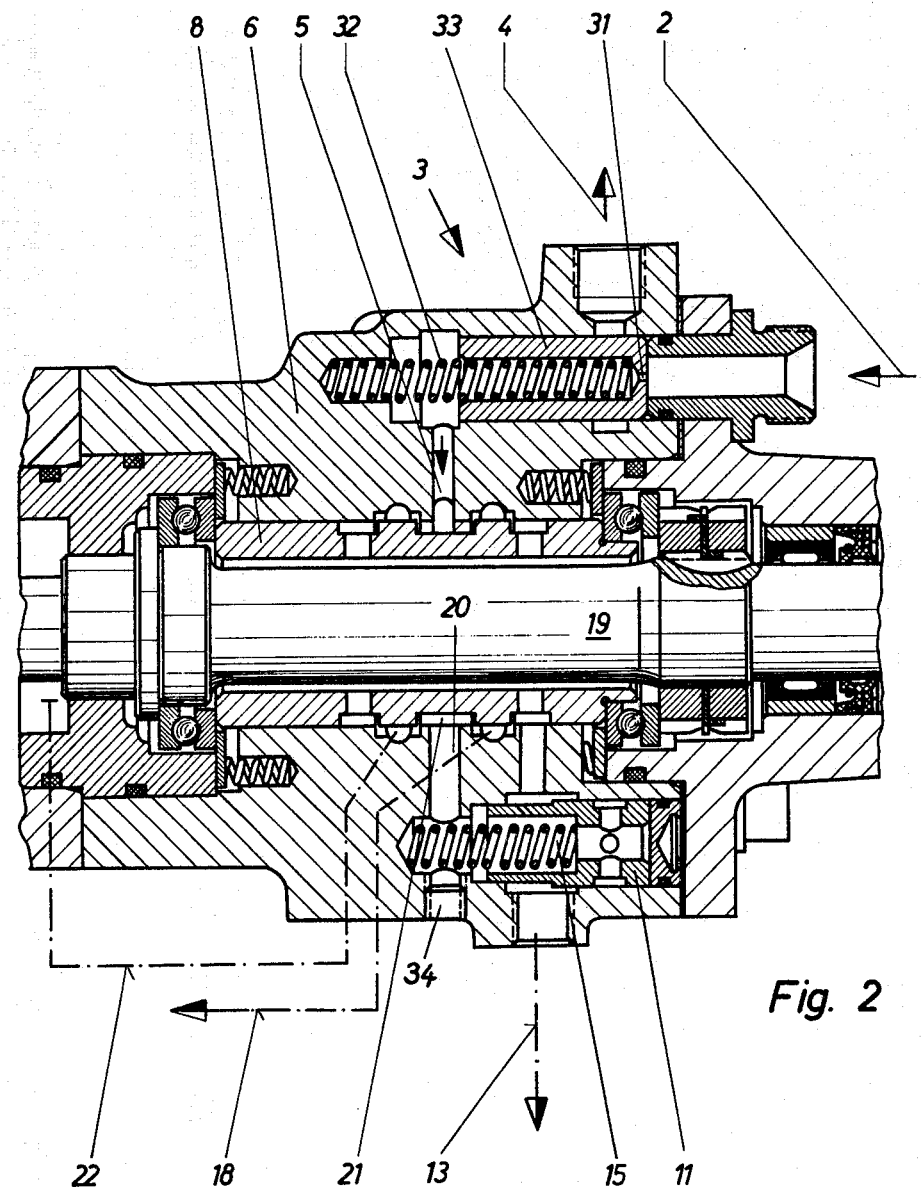
FIG. 2 is a longitudinal fragmentary cross section of the primary components in the steering booster mechanism housing which enter into the combination of the invention.

Assuming that pressure fluid is not passing to the steering booster cylinder, the fluid flows through the restricted orifice 31 passes via bore 5 to an annular pressure groove 21 in the housing via which fluid passes to a return line, such as line 13, as long as valve sleeve 8 is in the neutral position shown in FIG. 2. Accordingly, there is a continuous flow of pressure oil available for control by valve 8 to the double-ended steering boost cylinder in a manner heretofore known. When it is desired to operate the accessory cylinder, the control valve 9 is set to close return flow from conduit 4 via conduit 14 to the reservoir 16 and open a flow pass from conduit 4 via conduit 40 to cylinder 10, which increases the outlet pump pressure to the extent that sleeve 33 is shifted to the left by pressure on the orifice end overcoming spring 32. Pressure oil can then feed via conduit 4 to the manual control valve 9. The bore 20 shown in FIG. 2 is, of course, normally plugged at its outer end, otherwise conduits 18 and 22 could not be pressurized, as will be obvious from consideration of the drawing, it being noted that the outer end of bore 20 shows a plug 34.

The relief valve 11 serves as an excess pressure valve for fluid from bore 20 in the event that pressure in the steering control valve 8 moves beyond the permissible degree. In this case pressure relief valve 11 would be shifted to the left due to the fact that the right-hand end area has a larger area than the left-hand end and the right-hand end area is exposed to fluid pressure as will be apparent from the description above and from the detailed description found in the U.S. patent referred to hereinabove.

If the valve 9 be actuated to connect conduit 4 with conduit 40, pressure fluid will flow to the accessory cylinder 10 for performing work. Assuming a hoist is being operated and has been raised to a desired position, the valve 9 can be actuated to cut off flow from conduit 4 thus locking the piston of the accessory cylinder. A further actuation of valve 9 serves to connect conduit 40 with conduit 14 whence the accessory cylinder will expel oil to the reservoir 16.

In order to avoid dangerous build up of pressure in the accessory cylinder, a relief valve 12 is utilized which bypasses the manual valve 9 by being connected to the inlet conduit 4 for that valve and the outlet conduit 14 of that valve. It will thus be apparent that pressure may be limited to whatever setting the relief valve 12 is adjusted to.

The hydraulic circuitry comprises a pair of loops, one for the booster steering and another for the accessory, wherein the pump and reservoir effect a common side for the loops.

From the preceding description it will be apparent that a compact, economical and simplified flow divider system has been accomplished by the invention and that various changes may be made without departing from the spirit thereof.

What is claimed is:

1. A pressure distribution system comprising in combination, a power steering mechanism having a housing and a steering control valve (3) therein, a pressure responsive flow divider valve (33) in said housing having an end provided with a flow restrictor orifice (31) therethrough and means (5) connecting pressure flow through said orifice to said steering control valve for continuous pressure fluid communication thereto, inlet means for connecting said flow divider valve to a source of fluid pressure, said divider valve being biased (32) to a closed position and movable by fluid pressure to an open position, outlet means (4) for an accessory device to be placed in communication with said fluid pressure source upon pressure actuated opening movement of said flow divider valve whereby an increase in normal fluid pressure to said flow divider valve effects opening of said divider valve to supply pressure fluid to said accessory device, including a pressure relief valve (11) in said housing, said steering control valve (3) having passage means (5, 21, 20) effecting flow communication between said flow divider valve and said pressure relief valve, and port means to alternately connect said passage means to a source of pressure fluid, said port means being normally closed when said system is used with an accessory device.

2. A pressure medium control device for a booster steering system of a motor vehicle for controlling booster pressure flow, and for controlling pressure flow to auxiliary equipment from the same pump that supplies steering booster pressure; said device comprising a housing and a booster steering control valve therein actuatable by a steering spindle; a steering spindle extending into said housing; a pressure relief valve (11) in said housing and a flow dividing valve (33) in said housing; said flow dividing valve having orifice passage means connecting to said steering control valve and said pressure relief valve having passage means connecting to said steering control valve, and said housing having means for connecting said flow divider valve to a source of fluid pressure and for alternately connecting said steering spindle valve to said source of fluid pressure.

3. A pressure distribution system comprising in combination, a power steering mechanism having a housing (6), a steering spindle (19) extending into the housing, a steering control valve (3) located in the housing and actuatable by the steering spindle, a pressure responsive flow divider valve (33) in said housing having and end with a flow restrictor orifice (31) therethrough and means (5) connecting pressure flow through said orifice to said steering control valve for continuous fluid pressure communication thereto, inlet means for connecting said flow divider valve to a source of fluid pressure, a reservoir (16) connected to said source of pressure fluid, said divider valve being biased to a closed position and movable by fluid pressure to an open position, outlet means (4) for an accessory device to be placed in communication with said fluid pressure source upon pressure actuated opening movement of said flow divider valve whereby an increase in normal fluid pressure to said flow divider valve effects opening of said divider valve to supply pressure fluid to said accessory device, including a pressure relief valve (11) in said housing, said steering control valve having passage means (5, 21, 20) effecting flow communication between said flow divider valve and said pressure relief valve, said pressure relief valve communicating with said reservoir for relieving pressure by permitting flow from said inlet means to said reservoir via said steering control valve, and means (34) for optionally connecting said source of fluid pressure to said passage means when said system is to be used only for steering.

4. A device as set forth in claim 2, wherein said steering conrol valve is disposed in said housing intermediate said flow dividing valve and said pressure relief valve; passage means from said flow dividing valve and said steering control valve having an annular groove connecting to said passage means for communicating flow from said flow dividing valve to said steering control valve; and a passage in said housing connecting said annular groove with said pressure relief valve.

5. A device as set forth in claim 2, said housing having a bore axially parallel to said steering spindle and said divider valve being axially reciprocal in said bore.

References Cited
UNITED STATES PATENTS

| | | | |
|---|---|---|---|
| 1,993,612 | 3/1935 | Lum. | |
| 2,462,983 | 3/1949 | MacDuff et al. | |
| 2,603,065 | 7/1952 | Sarto | 60—52 |
| 2,674,092 | 4/1954 | Gardiner | 60—52 |
| 2,708,344 | 5/1955 | Greer | 60—52 |
| 2,737,196 | 3/1956 | Eames | 60—52 |
| 2,771,958 | 11/1956 | Ball. | |
| 2,846,850 | 12/1958 | Hall. | |
| 2,859,762 | 11/1958 | Banker. | |
| 3,242,824 | 3/1966 | Jablonsky et al. | 91—380 |
| 3,320,745 | 5/1967 | Bahniok et al. | |
| 3,200,830 | 8/1965 | Moyer et al. | 137—101 |
| 3,334,705 | 8/1967 | Lam. | |
| 3,363,516 | 1/1968 | Hubbard | 137—101 XR |

EDGAR W. GEOGHEGAN, Primary Examiner

U.S. Cl. X.R.

60—52; 137—101